US012417005B1

(12) United States Patent
Tang et al.

(10) Patent No.: US 12,417,005 B1
(45) Date of Patent: Sep. 16, 2025

(54) TOUCH PANEL WITH WELL-DESIGNED TOUCH PATTERN

(71) Applicant: Novatek Microelectronics Corp., Hsinchu (TW)

(72) Inventors: Yu-Ying Tang, Taoyuan (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/884,130

(22) Filed: Sep. 13, 2024

Related U.S. Application Data

(60) Provisional application No. 63/653,227, filed on May 30, 2024.

(51) Int. Cl.
*G06F 3/044* (2006.01)

(52) U.S. Cl.
CPC .................. *G06F 3/0448* (2019.05)

(58) Field of Classification Search
None
See application file for complete search history.

(56) References Cited

U.S. PATENT DOCUMENTS

2016/0274703 A1* 9/2016 Satou ............... G06F 3/0445
2019/0064960 A1* 2/2019 Na ..................... H10K 59/40

* cited by examiner

Primary Examiner — Aneeta Yodichkas
(74) Attorney, Agent, or Firm — JCIPRNET

(57) ABSTRACT

The touch panel includes a plurality of first electrodes, a plurality of second electrodes, and a plurality of bridge structures. Each of the first electrodes includes a first branch, a second branch, a third branch and a fourth branch. The first and second branches are opposite to each other, and the third and fourth branches are opposite to each other. Each of the second electrodes includes a fifth branch, a sixth branch, a seventh branch and an eighth branch. The fifth and sixth branches are adjacently connected to each other, and the seventh and eighth branches are adjacently connected to each other. Each of the bridge structures connects the first and second branches of the first electrode. The third branch, the seventh branch, the first branch and the fifth branch are alternately arranged, and the fourth branch, the eighth branch, the second branch and the sixth branch are alternately arranged.

11 Claims, 11 Drawing Sheets

TOUCH PANEL WITH WELL-DESIGNED TOUCH PATTERN

CROSS-REFERENCE TO RELATED APPLICATION

This application claims the priority benefit of U.S. provisional application Ser. No. 63/653,227, filed on May 30, 2024. The entirety of the above-mentioned patent application is hereby incorporated by reference herein and made a part of this specification.

BACKGROUND

Technical Field

The invention relates to a panel, and in particular, to a touch panel with a well-designed touch pattern.

Description of Related Art

Capacitive touch panels with mutual capacitance are capable of detecting changes in mutual capacitance. This is achieved by the mutual capacitance of the electrode pattern of the touch sensor when touched, thereby determining the behavior of the touch and the location of the touch. This detection technology is widely employed in input interfaces for mobile devices.

The design of the mutual capacitance touch pattern has a significant impact on its performance. A well-designed touch pattern can enhance the performance of a touch panel. Traditional touch patterns, such as the snowflake pattern and the diamond pattern, have been found to have limitations in terms of sensitivity and signal degradation in the case of poor grounding.

In addition, the traditional pattern doesn't work well in foldable covers because it doesn't have the versatility for different structures.

SUMMARY

The invention is directed to a touch panel, capable of increasing signal intensity and reducing signal degradation.

An embodiment of the invention providing a touch panel, including a plurality of first electrodes, a plurality of second electrodes, and a plurality of bridge structures. Each of the first electrodes includes a first branch, a second branch, a third branch and a fourth branch. The first branch and the second branch are opposite to each other, and the third branch and the fourth branch are opposite to each other. Each of the second electrodes includes a fifth branch, a sixth branch, a seventh branch and an eighth branch. The fifth branch and the sixth branch are adjacently connected to each other, and the seventh branch and the eighth branch are adjacently connected to each other. Each of the bridge structures connects the first branch and the second branch of the first electrode. The third branch, the seventh branch, the first branch and the fifth branch are alternately arranged, and the fourth branch, the eighth branch, the second branch and the sixth branch are alternately arranged.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
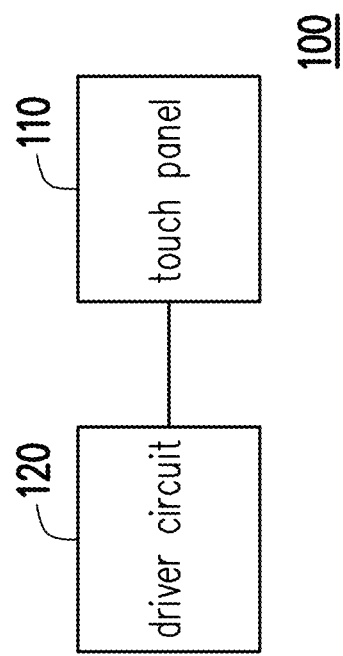
FIG. 1 is a block diagram illustrating a touch apparatus according to an embodiment of the invention.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the disclosure (including claims) are used to name elements or to distinguish different embodiments or scopes, neither to be used to limit upper or lower limit of the number of elements nor limit the sequence of the elements. In addition, wherever possible, elements/components/steps with the same reference numbers are used in the drawings and embodiments to represent the same or similar parts. Elements/components/steps using the same numbers or using the same terms in different embodiments may serve as cross-reference for each other.

FIG. 1 is a block diagram illustrating a touch apparatus according to an embodiment of the invention. Referring to FIG. 1, the touch apparatus 100 includes a touch panel 110 and a driver circuit 120. The driver circuit 120 is configured to drive the touch panel 110 to perform a touch sensing operation.

Figure 2A:
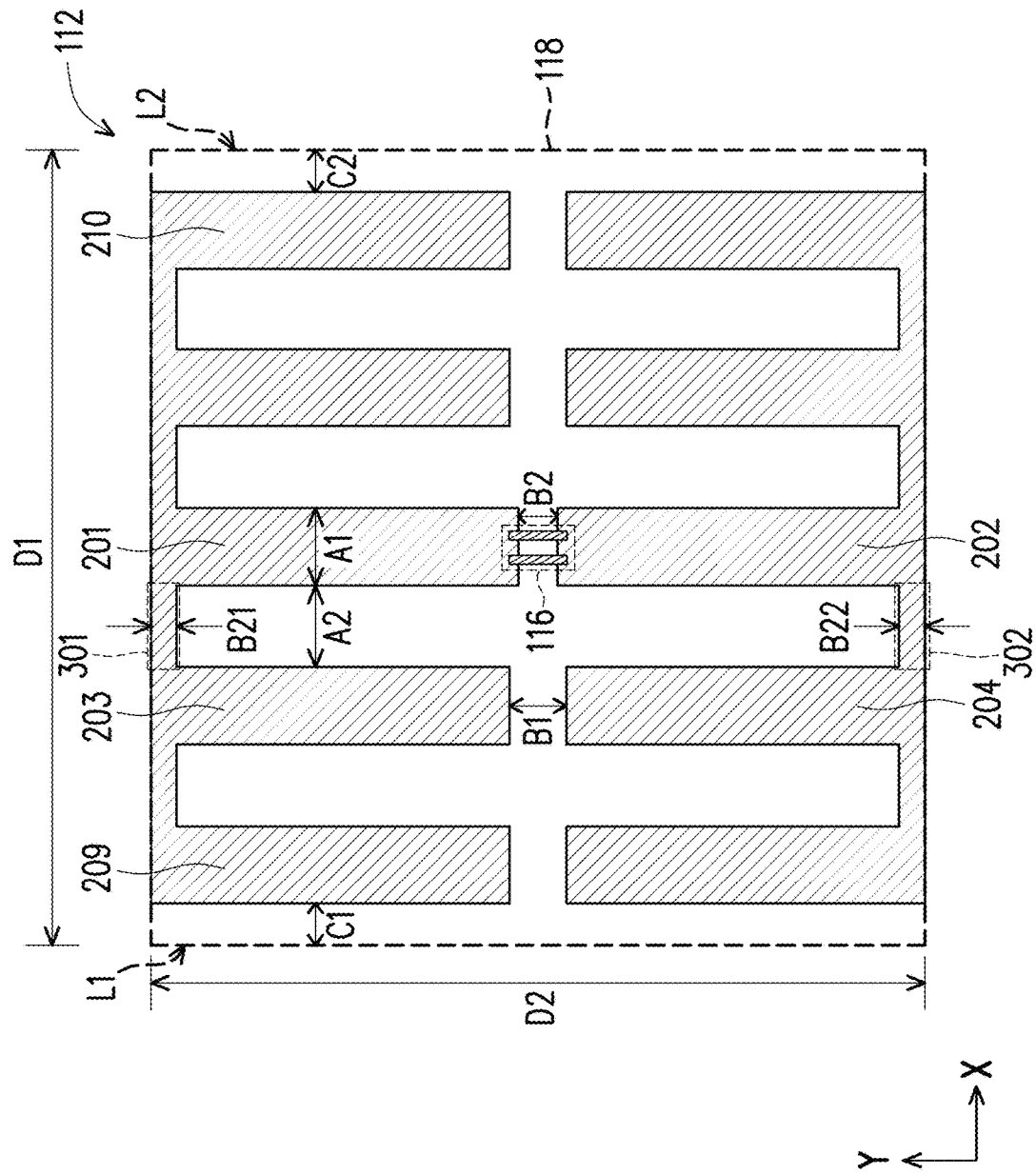
FIG. 2A and FIG. 2B are schematic diagrams illustrating a first electrode and a second electrode, respectively, according to an embodiment of the invention.
Figure 2B:
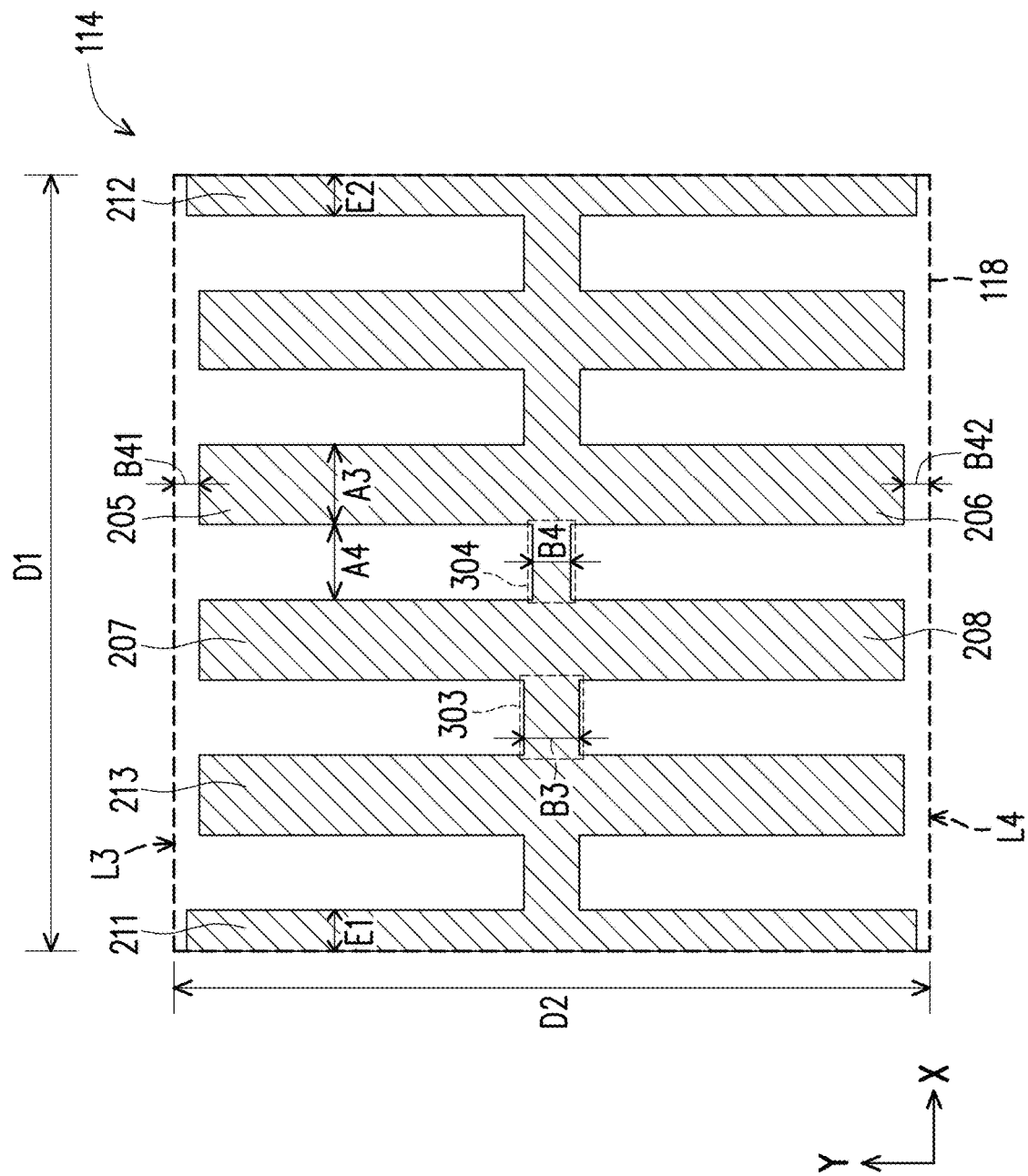
Figure 3:
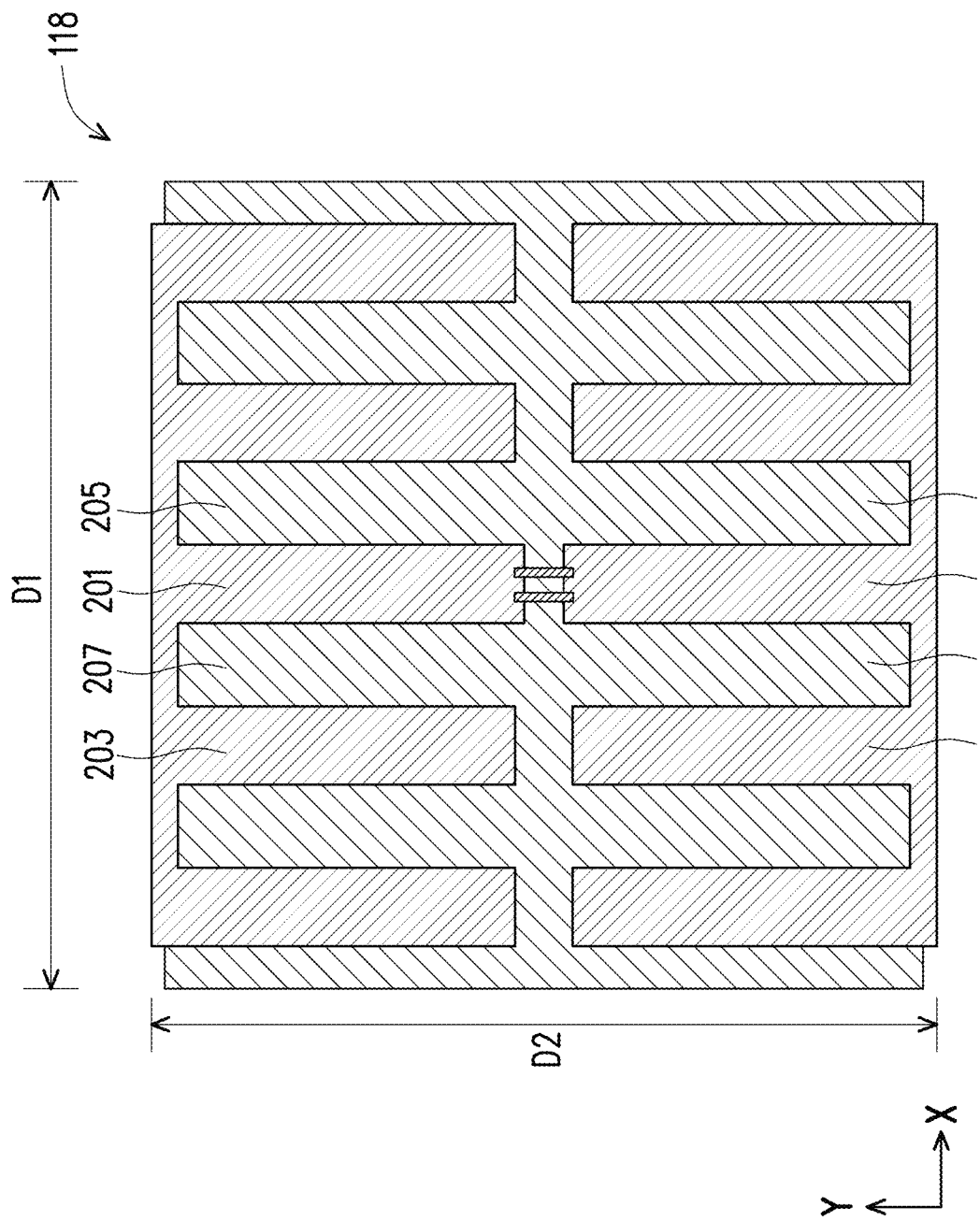
FIG. 3 is a schematic diagram illustrating a sensing unit according to an embodiment of the invention.

FIG. 2A and FIG. 2B are schematic diagrams illustrating a first electrode and a second electrode, respectively, according to an embodiment of the invention. FIG. 3 is a schematic diagram illustrating a sensing unit according to an embodiment of the invention.

Referring to FIG. 2A to FIG. 3, the touch panel 110 includes a plurality of first electrodes 112, a plurality of second electrodes 114 and a plurality of bridge structures 116. The first electrode 112 and the second electrode 114 has complementary shapes and can be combined to form a sensing unit 118. The touch panel 110 includes a plurality of sensing pads to perform the touch sensing operation. The sensing unit 118 may be serve as a sensing pad of the touch panel 110.

As shown in FIG. 2A and FIG. 2B, the first electrode 112 and the second electrode 114 are different fence-like electrodes. The first electrode 112 at least includes a first branch 201, a second branch 202, a third branch 203 and a fourth branch 204. The first branch 201, the second branch 202, the third branch 203 and the fourth branch 204 are arranged in a first direction X and extended in a second direction Y. The first branch 201 and the second branch 202 are opposite to each other in the second direction Y, and the third branch 203 and the fourth branch 204 are opposite to each other on another line in the second direction Y.

The bridge structure 116 connects the first branch 201 and the second branch 202 to make two portions of the first electrode 112 to be conductive. In the present embodiment, two conductive strip electrodes are used as an example of the bridge structure 116, but the shape and number of the electrodes are not intended to limit the invention.

The second electrode 114 at least includes a fifth branch 205, a sixth branch 206, a seventh branch 207 and an eighth branch 208. The fifth branch 205, the sixth branch 206, the seventh branch 207 and the eighth branch 208 are arranged in the first direction X and extended in the second direction Y. The fifth branch 205 and the sixth branch 206 are adjacently connected to each other in the second direction Y, and the seventh branch 207 and the eighth branch 208 are adjacently connected to each other on another line in the second direction Y.

In the present embodiment, the first electrodes and the second electrodes are metal plate electrodes, flexible metal-mesh electrodes, or indium tin oxide (ITO) electrodes, but the invention is not limited thereto. In the present embodiment, the materials of the first electrodes and the second electrodes may be molybdenum (Mo), aluminum (Al), titanium (Ti), copper (Cu), silver (Ag), or an alloy thereof, but the invention is not limited thereto.

As shown in FIG. 3, the first electrode 112 and the second electrode 114 are combined to form the sensing unit 118. The sensing unit 118 has a first pitch D1 in the first direction X and a second pitch D2 in the Y-direction. The first pitch D1 and the second pitch D2 comply with a condition of 0.8<D1/D2<1.2. In the sensing unit 118, the third branch 203, the seventh branch 207, the first branch 201 and the fifth branch 205 are alternately arranged from left to right in the first direction X. Similarly, the fourth branch 204, the eighth branch 208, the second branch 202 and the sixth branch 206 are also alternately arranged from left to right in the first direction X.

The structural parameters of the first electrode 112 and the second electrode 114 are described below.

Referring to FIG. 2A, a width of the first branch 201 in the first direction X is A1, and an interval A2 between the first branch 201 and the third branch 203 in the first direction X is A2. The width A1 and the interval A2 comply with a condition of 0.5<A1/A2<2. An interval between the third branch 203 and the fourth branch 204 in the second direction Y is B1, and an interval between the first branch 201 and the second branch 202 in the second direction Y is B2, and the intervals B1 and B2 comply with a condition of 0.5<B1/B2<2.

The first electrode 112 further includes a first segment 301 and a second segment 302 arranged in the second direction Y and extended in the first direction X. The first segment 301 is located between the first branch 201 and the third branch 203. The second segment 302 is located between the second branch 202 and the fourth branch 204. A width of the first segment 301 in the second direction Y is B21, and a width of the second segment 302 in the second direction Y is B22. The interval B1 and the widths B21 and B22 comply with a condition of B1=B21=B22.

In addition, the sensing unit 118 has a first edge line L1 and a second edge line L2 arranged in the first direction X, and the first electrode 112 further includes a ninth branch 209 and a tenth branch 210 arranged in the first direction X. An interval between the ninth branch 209 and the first edge line L1 in the first direction X is C1, and an interval between the tenth branch 210 and the second edge line L2 in the first direction X is C2. The intervals A2, C1 and C2 comply with a condition of C1+C2=A2.

Referring to FIG. 2B, a width of the fifth branch 205 in the first direction X is A3, and an interval between the fifth branch 205 and the seventh branch 207 in the first direction X is A4. The width A3 and the interval A4 comply with a condition of 0.5<A3/A4<2. The second electrode 114 further includes an eleventh branch 211, a twelfth branch 212 and a thirteenth branch 213 arranged in the first direction X. The second electrode 114 further includes a third segment 303 located between the seventh branch 207 and the thirteenth branch 213 and a fourth segment 304 located between the fifth branch 205 and the seventh branch 207. A width of the third segment 303 in the second direction Y is B3, and a width of the fourth segment 304 in the second direction Y is B4, and the widths B3 and B4 comply with a condition of 0.5<B3/B4<2.

The sensing unit 118 has a third edge line L3 and a fourth edge line L4 arranged in the second direction Y. An interval between the fifth branch 205 and the third edge line L3 in the second direction Y is B41, and an interval between the sixth branch 206 and the fourth edge line L4 in the second direction Y is B42. The width B4 and the intervals B41 and B42 comply with a condition of B4=B41=B42.

In addition, a width of the eleventh branch 211 in the first direction X is E1, and a width of the twelfth branch 212 in the first direction is E2. The widths A3, E1 and E2 comply with a condition of E1+E2=A3.

In a case where the shapes of the first electrode 112 and the second electrode 114 are complementary, the structural parameters A1, A2, A3 and A4 comply with the conditions of A2≥A3 and A4≥A1.

In the present embodiment, the first electrode 112 is configured to have ten identical branches and the second electrode 114 is configured to have eight identical branches. However, the number and shape of the branches of each electrode are not intended to limit the invention.

In order to optimize the touch sensing intensity, the width and the ratio of the branches of the first electrodes and the second electrodes can be designed according to the above structural parameters. However, the above structural parameters of the first electrode 112 and the second electrode 114 are by way of example, but are not intended to limit the invention.

Figure 4:
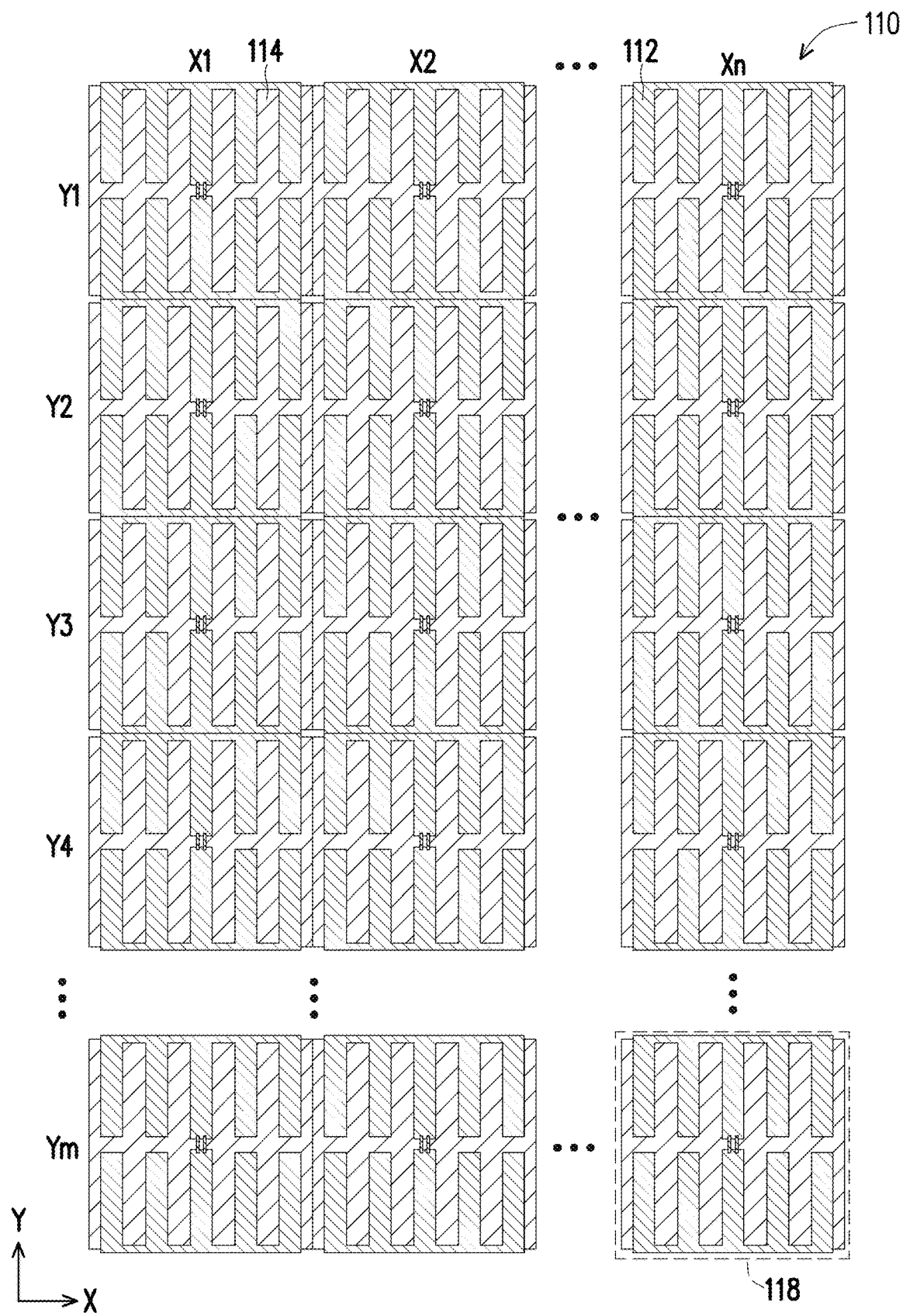
FIG. 4 illustrates a touch pattern arrangement on the touch panel according to an embodiment of the invention.
Figure 5A:
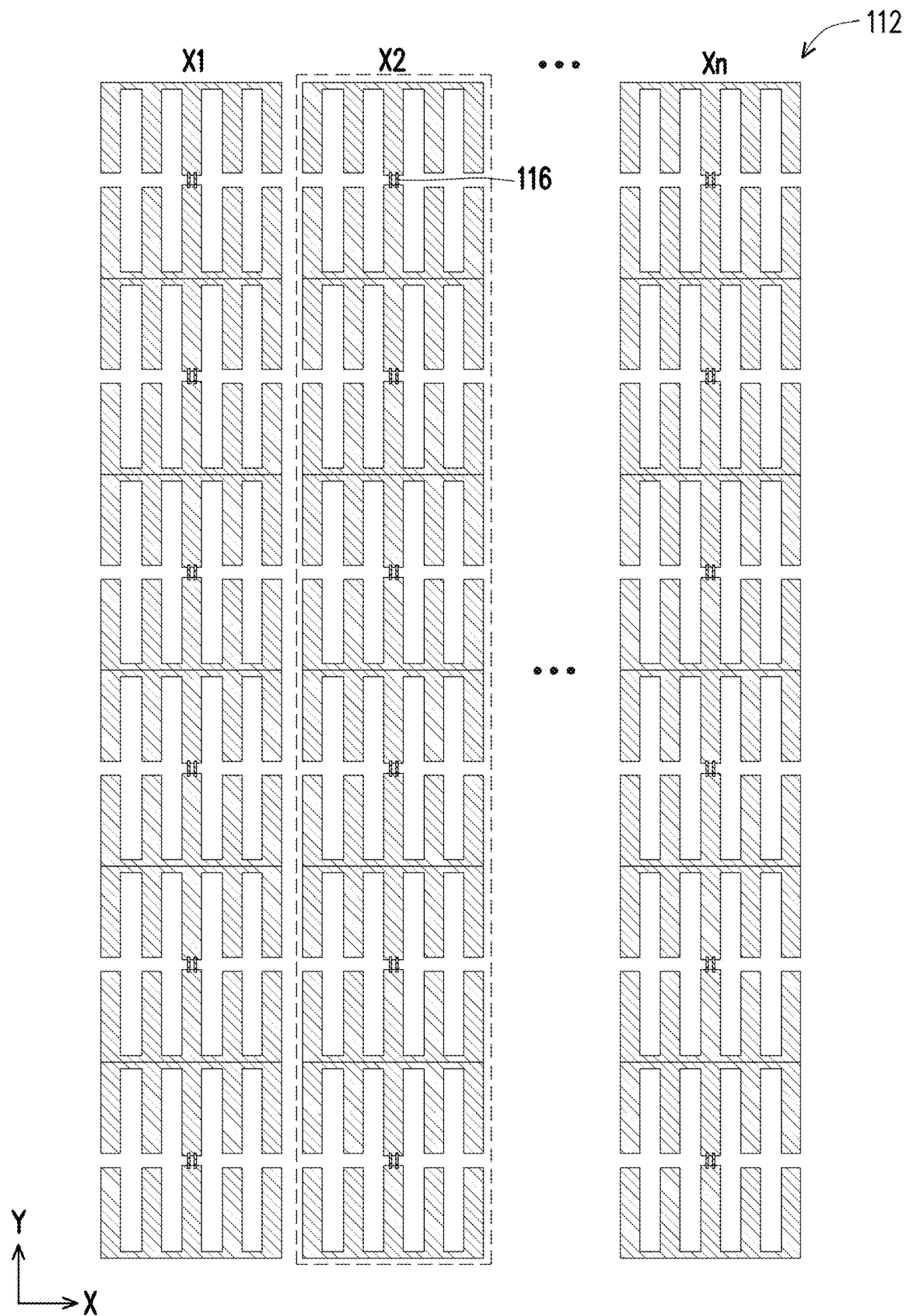
FIG. 5A and FIG. 5B respectively illustrate the first electrode arrangement and the second electrode arrangement of FIG. 4.
Figure 5B:
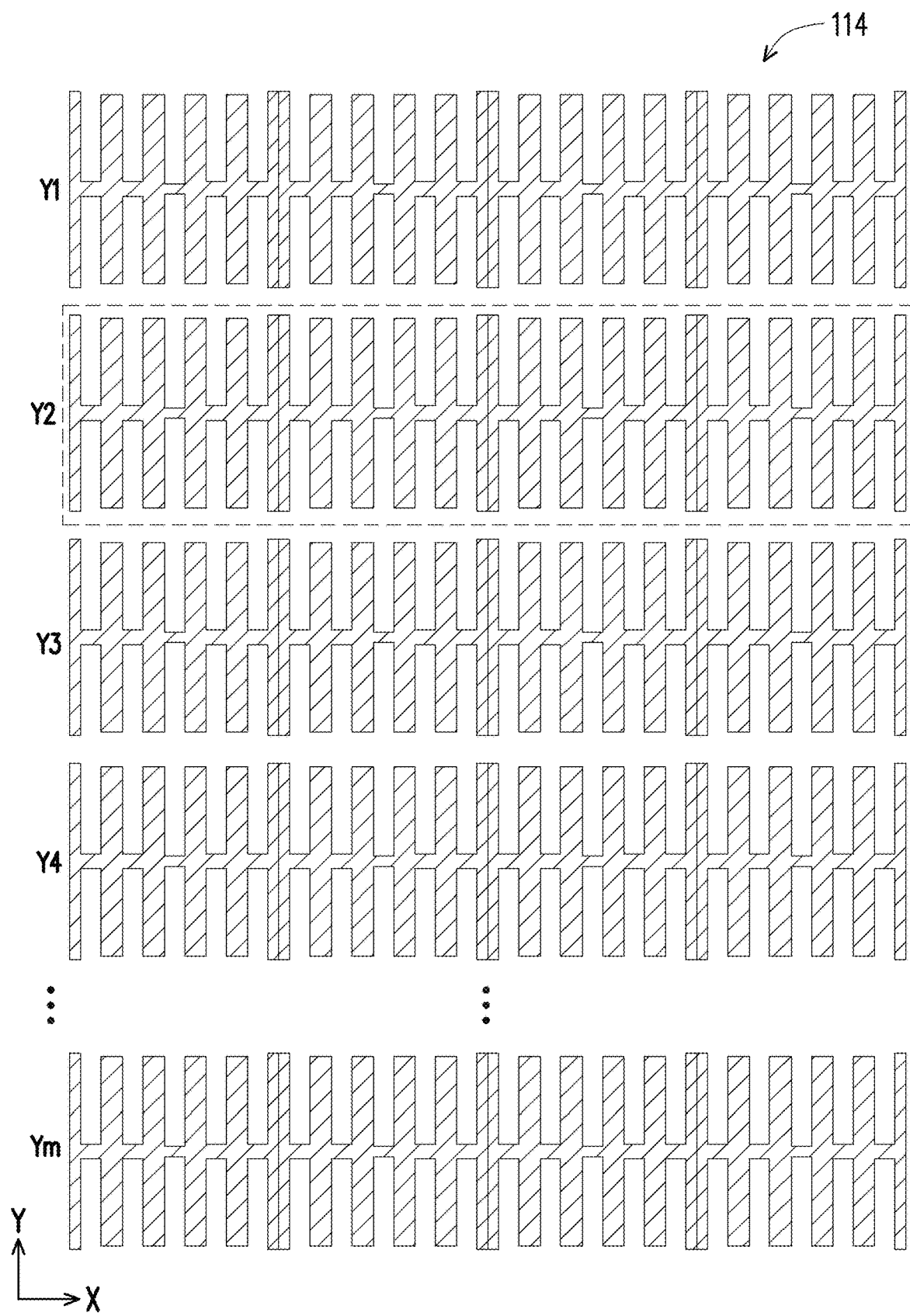

FIG. 4 illustrates a touch pattern arrangement on the touch panel according to an embodiment of the invention. FIG. 5A and FIG. 5B respectively illustrates the first electrode arrangement and the second electrode arrangement of FIG. 4. Referring to FIG. 4 to FIG. 5B, the first electrodes 112 are connected to each other in the second direction Y through a plurality of bridge structures 116, and form separate first channels X1 to Xn in the first direction X. The second electrodes 114 are connected to each other in the first direction X through a plurality of segments 303, 304, and form separate second channels Y1 to Ym in the second direction Y. The first electrodes 112 and the second electrodes 114 form n×m mutual capacitance nodes, where n and m are positive integers.

In the present embodiment, the first electrodes 112 serve as driving electrodes, and the second electrodes 114 serve as sensing electrodes. The driver circuit 120 sequentially drives the first channels from X1 to Xn, and receives sensing signals from the second channels Y1 to Ym.

Figure 6:
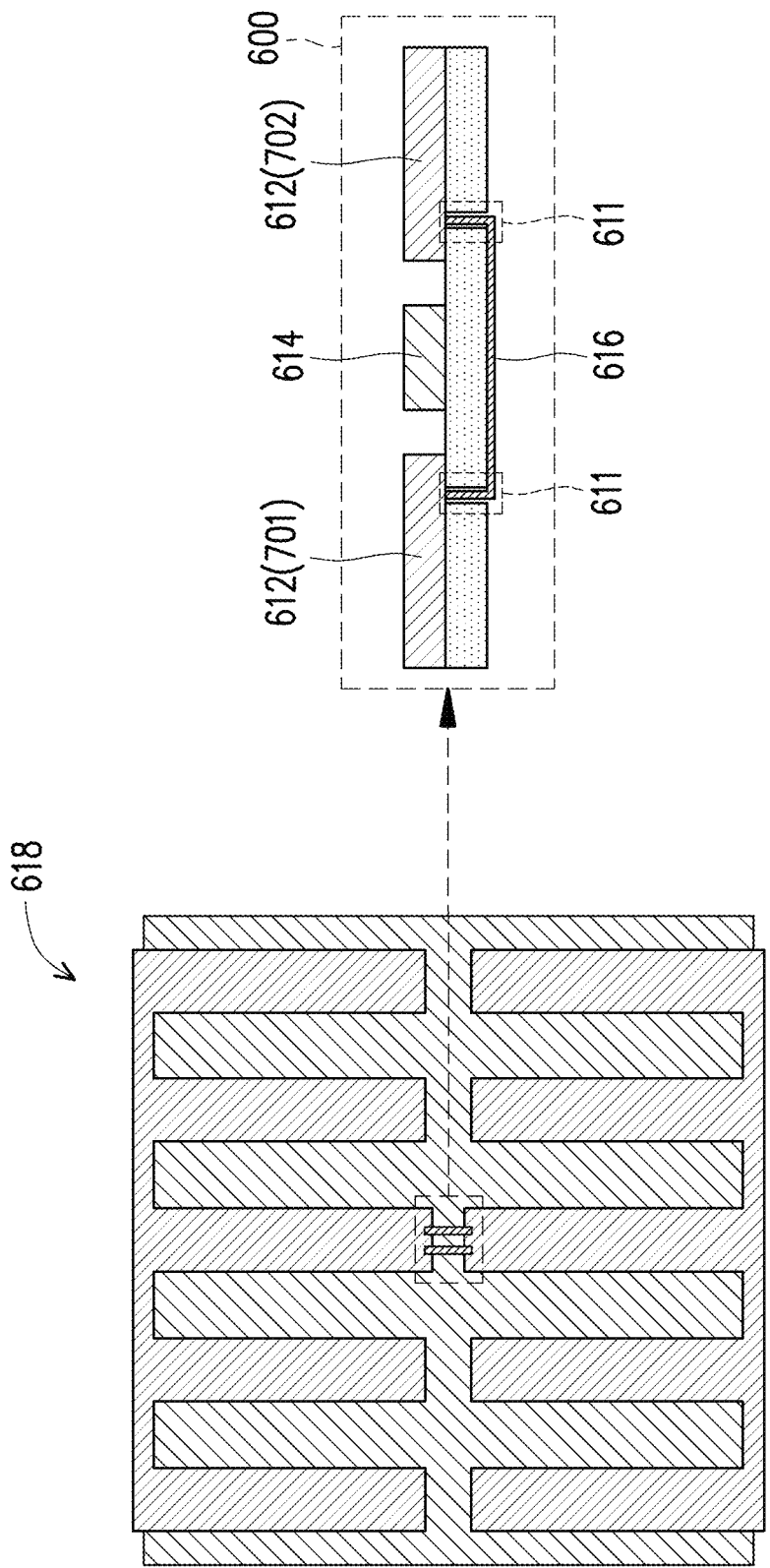
FIG. 6 illustrates a cross-section of a bridge area according to an embodiment of the invention.

FIG. 6 illustrates a cross-section of a bridge area 600 according to an embodiment of the invention. Referring to FIG. 6, each sensing unit 618 of the touch pattern includes a first electrode 612 and a second electrode 614. Two branches 701 and 702 of the first electrode 612 are connected by a bridge structure 616. The first electrode 612 and the second electrode 614 are on the same conductor layer, and the bridge structure 616 is on a different conductor layer. In the present embodiment, the bridge structure 616 crosses the second electrode 614 by means of through holes 611 and connects the separate branches 701 and 702.

Figure 7:
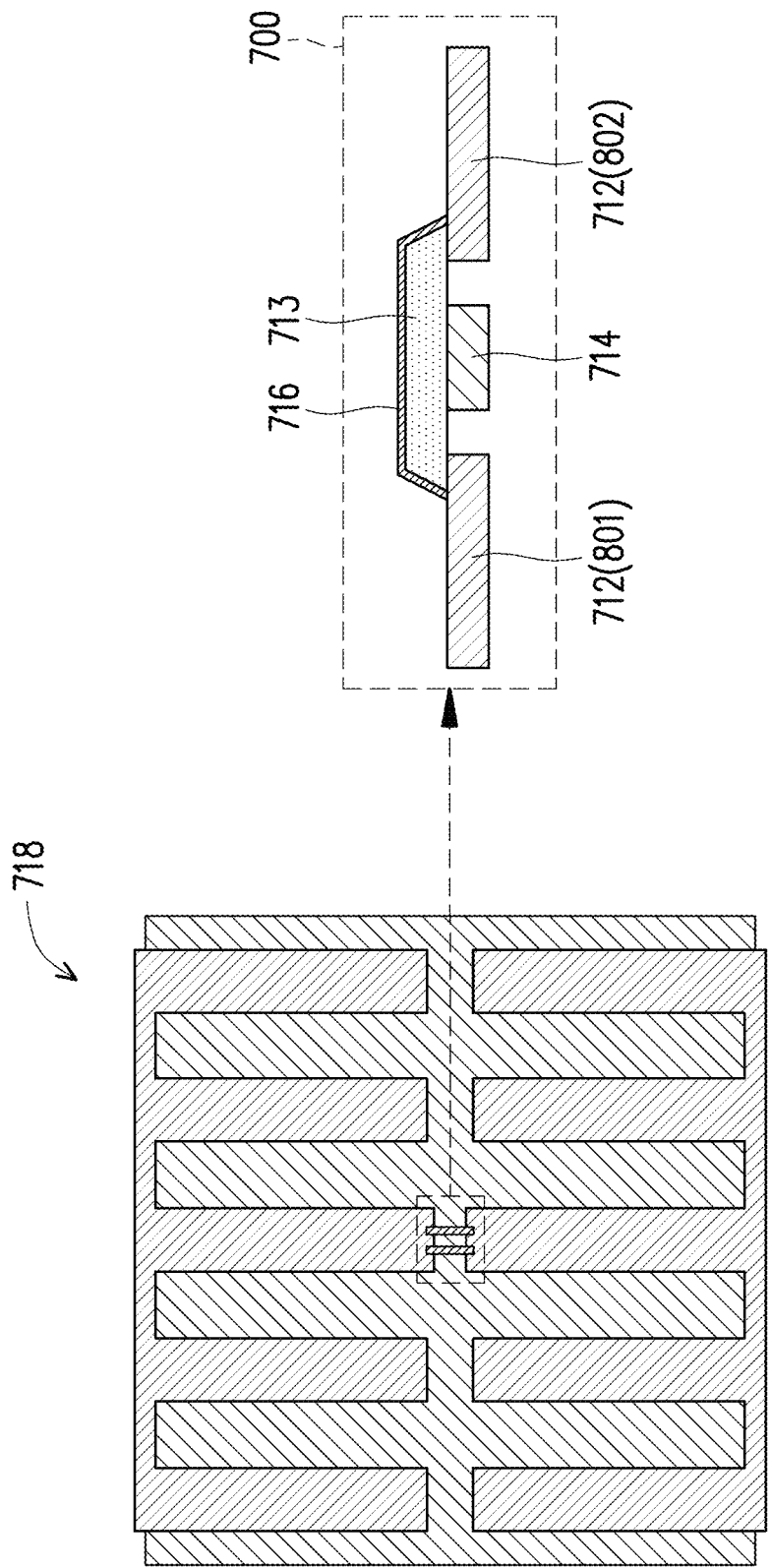
FIG. 7 illustrates a cross-section of a bridge area according to another embodiment of the invention.

FIG. 7 illustrates a cross-section of a bridge area 700 according to another embodiment of the invention. Referring to FIG. 7, for a sensing unit 718, the bridge structure 716 crosses the second electrode 714 by means of an insulating island 713 and connects the separate branches 801 and 802 of the first electrode 712.

The touch pattern of the disclosure may be applied to the following structures, but they are not intended to limit the invention.

Figure 8:
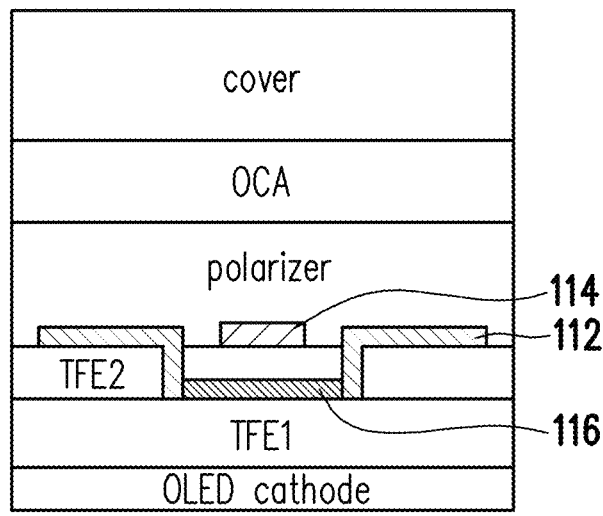
FIG. 8 shows a flexible organic light emitting diode (OLED) display with on-cell touch sensors according to another embodiment of the invention.
Figure 9:
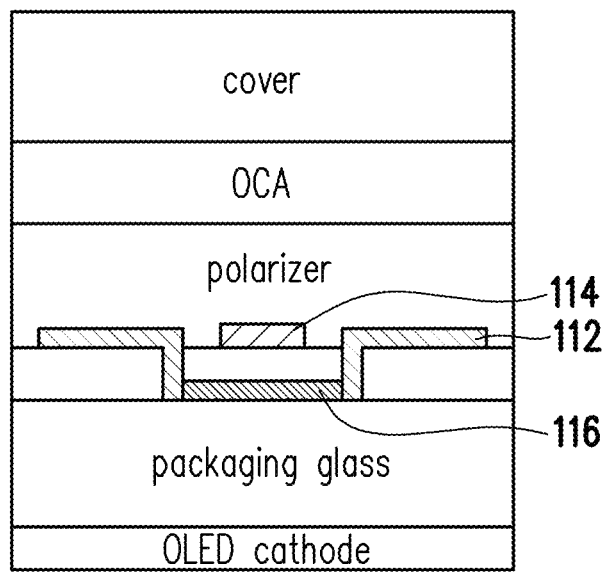
FIG. 9 shows an inflexible OLED display with on-cell touch sensors according to another embodiment of the invention.

FIG. 8 shows a flexible organic light emitting diode (OLED) display with on-cell touch sensors according to another embodiment of the invention. FIG. 9 shows an inflexible OLED display with on-cell touch sensors according to another embodiment of the invention. In FIG. 8 and FIG. 9, the devices TFE1 and TFE2 are thin film encapsulation layers, and the device OCA is optically clear adhesives. Taking FIG. 2A and FIG. 2B as an example, the first electrode 112, the second electrode 114 and the bridge structure 116 can be applied to the display structures of FIG. 8 and FIG. 9. The bridge structure 116 crosses the second electrode 114 by means of through holes and connects the separate branches of the first electrode 112

Figure 10:
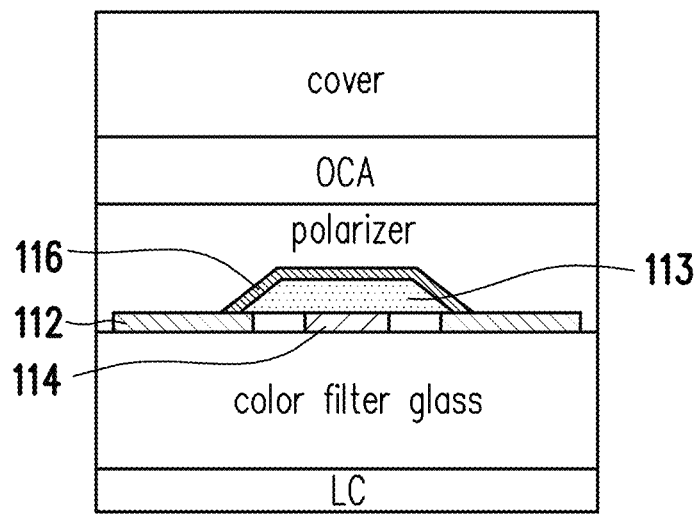
FIG. 10 shows a liquid crystal display (LCD) with on-cell touch sensors according to another embodiment of the invention.
Figure 11:
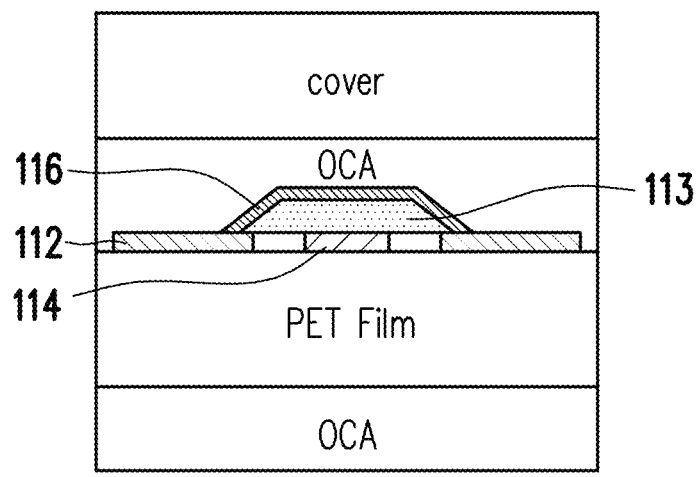
FIG. 11 shows an LCD with add-on touch sensors according to another embodiment of the invention.

FIG. 10 shows a liquid crystal display (LCD) with on-cell touch sensors according to another embodiment of the invention. FIG. 11 shows an LCD with add-on touch sensors according to another embodiment of the invention. In FIG. 10 and FIG. 11, the bridge structure 116 crosses the second electrode 114 by means of an insulating island 113 and connects to the separate branches of the first electrode 112.

Figure 12:
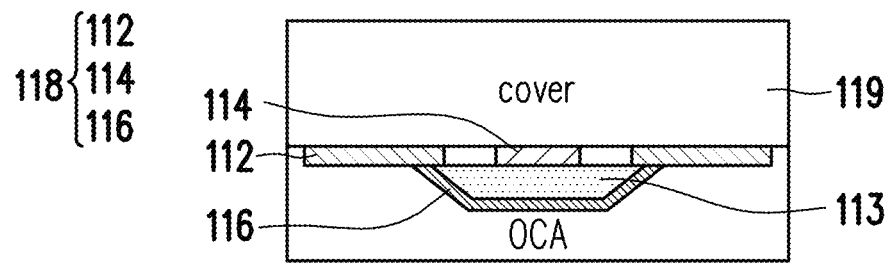
FIG. 12 shows a structure of OGS (On Glass Solution) sensors according to another embodiment of the invention.

FIG. 12 shows a structure of OGS (On Glass Solution) sensors according to another embodiment of the invention. In FIG. 12, the sensing unit 118 serves as a touch sensor and is disposed on a cover glass 119.

In summary, in the embodiments of the invention, the touch patterns have higher mutual capacitance change and lower signal attenuation ratio in the case of poor grounding in both straight and foldable architectures. This makes it possible for flexible panels with the proposed touch patterns to achieve cost reduction without having to change the touch patterns due to changes in the cover structures of the end products.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel, comprising:
   a plurality of first electrodes, each comprising a first branch, a second branch, a third branch and a fourth branch, wherein the first branch and the second branch are opposite to each other, and the third branch and the fourth branch are opposite to each other;
   a plurality of second electrodes, each comprising a fifth branch, a sixth branch, a seventh branch and an eighth branch, wherein the fifth branch and the sixth branch are adjacently connected to each other, and the seventh branch and the eighth branch are adjacently connected to each other; and
   a plurality of bridge structures, each connecting the first branch and the second branch of the first electrode,
   wherein the third branch, the seventh branch, the first branch and the fifth branch are alternately arranged, and the fourth branch, the eighth branch, the second branch and the sixth branch are alternately arranged,
   wherein the first electrodes and the second electrodes form a plurality of sensing units, and each of the sensing units comprises one first electrode and one second electrode,
   wherein each of the sensing unit has a first pitch D1 in a first direction and a second pitch D2 in a second direction, and the first pitch D1 and the second pitch D2 comply with a condition of 0.8<D1/D2<1.2,
   wherein a width of the first branch in the first direction is A1, an interval between the first branch and the third branch in the first direction is A2, and the width A1 and the interval A2 comply with a condition of 0.5<A1/A2<2.

2. The touch panel according to claim 1, wherein the first branch, the second branch, the third branch and the fourth branch are arranged in the first direction and extended in the second direction.

3. The touch panel according to claim 1, wherein the fifth branch, the sixth branch, the seventh branch and the eighth branch are arranged in the first direction and extended in the second direction.

4. The touch panel according to claim 1,
   wherein the sensing unit has a first edge line and a second edge line arranged in the first direction, and each of the first electrodes further comprises a ninth branch and a tenth branch arranged in the first direction,
   wherein an interval between the ninth branch and the first edge line in the first direction is C1, an interval between the tenth branch and the second edge line in the first direction is C2, and the intervals A2, C1 and C2 comply with a condition of C1+C2=A2.

5. The touch panel according to claim 1, wherein an interval between the third branch and the fourth branch in the second direction is B1, an interval between the first branch and the second branch in the second direction is B2, and the intervals B1 and B2 comply with a condition of 0.5<B1/B2<2.

6. The touch panel according to claim 5,
   wherein each of the first electrodes further comprises a first segment and a second segment arranged in the second direction and extended in the first direction, the first segment is located between the first branch and the third branch, and the second segment is located between the second branch and the fourth branch, wherein a width of the first segment in the second direction is B21, a width of the second segment in the second direction is B22, and the interval B2 and the widths B21 and B22 comply with a condition of B2=B21=B22.

7. The touch panel according to claim 1, wherein a width of the fifth branch in the first direction is A3, an interval between the fifth branch and the seventh branch in the first direction is A4, and the width A3 and the interval A4 comply with a condition of 0.5<A3/A4<2.

8. The touch panel according to claim 7, wherein each of the second electrodes further comprises an eleventh branch and a twelfth branch arranged in the first direction, wherein a width of the eleventh branch in the first direction is E1, a width of the twelfth branch in the first direction is E2, and the widths A3, E1 and E2 comply with a condition of E1+E2=A3.

9. The touch panel according to claim 7, wherein each of the second electrodes further comprises a thirteenth branch arranged in the first direction, a third segment located between the seventh branch and the thirteenth branch, and a fourth segment located between the fifth branch and the seventh branch, wherein a width of the third segment in the second direction is B3, a width of the fourth segment in the second direction is B4, and the widths B3 and B4 comply with a condition of 0.5<B3/B4<2.

10. The touch panel according to claim 9, wherein the sensing unit has a third edge line and a fourth edge line arranged in the second direction, wherein an interval between the fifth branch and the third edge line in the second direction is B41, an interval between the sixth branch and the fourth edge line in the second direction is B42, and the width B4 and the intervals B41 and B42 comply with a condition of B4=B41=B42.

11. The touch panel according to claim 1, wherein the first electrodes and the second electrodes are different fence-like electrodes.

* * * * *